3,173,847
PROCESS OF PRODUCING KERATINASE

Donald A. Kita, Essex, and John B. Routien, Old Lyme, Conn., assignors to Chas. Pfizer & Co., Inc., New York, N.Y., a corporation of Delaware
No Drawing. Filed Dec. 26, 1962, Ser. No. 247,316
3 Claims. (Cl. 195—5)

The present invention relates to the cultivation under controlled conditions of a fungus to produce an active keratinase. In particular, this invention deals with a proteolytic enzyme produced thereby capable of acting on keratinaceous materials and with depilatory compositions containing said keratinase as the active ingredient.

The protein keratin is distinguished from other proteins by its ability to resist degradation. Among the many materials which are found in nature that are considered keratinaceous materials are feathers, hoofs of animals, fish scales and animal hair. The present invention has as one of its objectives, by means of the enzyme, the conversion of readily available inexpensive keratinaceous materials into materials which have a much higher economic value than the raw products from which they are produced, for example, the degradation of keratinaceous material to produce extremely useful and valuable polypeptides and amino acids. The purposes for which these products are employed are well-known by those skilled in the art, for example, animal and human food supplement. Another objective of this invention is to prepare depilatories that contain this enzyme. This depilatory activity is particularly useful in cosmetic preparations for humans and for the unhairing of animal hides. This keratinase is substantially free of sulfhydryl groups and it is not necessary to provide a medium of high alkalinity to obtain the desired results. These features distinguish the depilatory compositions produced by the enzyme of this invention from many of the prior art compositions which contain sulfides and hydrosulfides of alkaline earth metals.

The fungus organism which is employed to produce the enzyme of this invention was isolated from a soil sample that originated in Palmerston North, North Island, New Zealand. This soil sample was mixed with water in a Petri dish and short pieces of sterilized human hair were scattered over the surface. It was incubated for 1 month with addition of sterile water at such time as was necessary in order to keep the sample moist. At the end of this period the fungi that had developed on the hairs were isolated to slants of potato-dextrose-agar and to slants of BBL Mycosel Agar. These slants were then incubated at 28° C. until growth was well established. The isolated culture of this invention was planted in the center of a Petri dish of BBL Mycosel Agar and incubated at 28° C. The growth was described by Dr. J. B. Routien as follows:

After nine days of growth the colony was 44 mm. wide, slightly raised over the entire surface, white on the periphery, lighter in color than Ridgway's Pale Olive Buff with a creamy tint in the older part of the colony; aleuriospores were produced in the colored portion, and this portion of the colony was somewhat flattened and velvety in appearance with the outer white part somewhat raised and somewhat cottony; edge entire, surface smooth, no odor. At the end of 26 days of incubation at 28° C. the culture was wider in diameter, loose, thin and with cleistothecia numerous and well developed and showing as dark brownish spots by transmitted light. The abundance of aleuriospores gave a distinct powdery appearance to the surface of the culture. The reverse of the colony was creamy yellow. There was no soluble pigment.

Hyphae were hyaline; vegetative branches arising at acute or right angles but branches terminating in aleuriospores arising at right angles only; hyphae of rather uniform diameter in the younger part of the colony, measuring mostly 3.3–4.0$\mu$ in width but wider where racquet hyphae were formed and where internal aleuriospores were produced; many narrower hyphae, approximately 2.0$\mu$ wide, were formed in older parts of the colony; hyphae septate with many septa where internal aleuriospores or branches bearing external aleuriospores were produced. The term aleuriospore is used here as Vuillemin used it in his paper in Bulletin de la Societé des Sciences de Nancy, Serie 3, 12: 151–175, 1911. There he referred to the spores as being terminal, lateral or intercalary. In the description here of our organism the term "external aleuriospores" would include both terminal and lateral ones, and the term "internal aleuriospores" would include the intercalary ones.

Cleistothecia began to form in about 10 days after initiation of growth of the fungus on the Petri dish. The beginning stages of formation consisted of the encirclement of a short globose branch by a hypha which curled around this ascogonial initial; later proliferation of hyphae around the developing ascogonium gave rise to cleistothecia. Cleistothecia were well formed in two weeks, crowded in groups over the surface of the agar and under the layer of aleuriospores, round to broadly elliptical or flattened by mutual pressure, smooth, 220–470$\mu$ in diameter in the round form, 220–375 x 315–440$\mu$ in elliptical forms. Peridium 7.7–8$\mu$, mostly 8–9.5$\mu$, thick, fragile, consisting of an outer layer 2 cells thick of dark brown cells with thickened walls and of an inner layer 3 or 4 cells thick of larger, thin-walled hyaline cells; wall prosenchymatous, rupturing easily and in different places from pressure; no ostiole. Cleistothecia at first pink, finally dark brown and in age olive brown.

Asci numerous, filling the cleistothecia; no paraphyses or other sterile tissue in the mature cleistothecia. Asci round to elliptical, 10–13 x 8–11$\mu$, wall disappearing early and leaving the spores in groups of 8.

Ascospores broadly elliptical, sometimes slightly comma shaped or tear-drop shaped, pale brown in transmitted light, 5–6.5 x 4.0–5.0$\mu$; wall sculptured in the form of a reticulum, about 0.5$\mu$ thick; wall of spore about 0.5–0.7$\mu$ thick; no germ spore.

The powdery appearance of the colony was due to the production of large numbers of both internal and external aleuriospores. The external aleuriospores were borne directly on the hyphae or on branches of varying lengths that arose at right angles to the main branch. They were set free by the collapse of the hyphae and always showed a bit of hypha still attached. External aleuriospores were nearly round to oblong with truncate base, smooth except for the fragment of hypha at the base; range of size based on measurements of 50 spores was 6.0–16.5 x 3.3–6.6$\mu$; most frequent size was 9–13.5 x 4.0–5.3$\mu$; average was 11.0 x 4.7$\mu$.

Internal aleuriospores were longer and wider and were set free by the collapse of the adjacent parts of the hyphae. These dead portions of hyphae finally were to be seen only as thin threads along which the aleuriospores were scattered somewhat like beads on a string. Isolated internal aleuriospores had fragments of the parent hypha attached to both ends.

Single ascospore isolates were made by spreading a suspension of ascospores and aleuriospores on the surface of an agar plate, identifying the single ascospore under high dry power of the microscope and checking the vicinity in order to be certain that no aleuriospores were nearby, then under low power of the microscope cutting out a small piece of agar bearing the single ascospore and transferring it to a slant of Mycosel Agar.

Ten single ascospore isolates were obtained in this manner and incubated at 28° C.

Microscopic examination of these 10 isolates showed that all produced aleuriospores. Two of the isolates also produced cleistothecia. The other 8 did not produce cleistothecia and therefore had only the imperfect spores. Whether the two cultures producing cleistothecia represent two cases in which spores of opposite mating types adhered to each other and were not seen when the supposedly single ascospore isolate was made or whether they represent homothallic strains derived from the parent cleistothecium is not known at present.

Experiments were made with the 8 single ascospore isolates that had only the imperfect stage by pairing them on plates of Mycosel Agar with the plantings made about ½ inch apart. After three weeks of incubation of these matings examination was made by means of a microscope to determine whether cleistothecia were produced. It was found that 4 of the single ascospore isolates when mated with each other failed to produce cleistothecia and that the other 4 strains when mated among themselves in pairs also failed to produce cleistothecia. In certain of these combinations what seemed to be a distinct line of aversion between the two cultures involved was found. This line could not be correlated with any feature of either of the two cultures.

When any one of the 4 single ascospore isolates of either of the two groups described was mated with an isolate of the other group, a distinct line of cleistothecia was formed. These were perfectly mature cleistothecia with normal ascospores.

On the basis of this information, the culture can be described as being heterothallic with two different mating types. There is the possibility that some of the ascospores may give rise to homothallic strains.

The range of size of the external aleuriospores of the single ascospore isolates ranged from the most common size of 6.5–10.0 x 4.0–5.3$\mu$ for one strain up to 10.5–17.0 x 5.3–6.5$\mu$ for other strains. Three strains had nearly the same, smaller size of spores; the other five had a similar, larger size. The spore size of the strain was never correlated with the mating type of that strain.

This fungus would be placed in the family Eurotiaceae of the Perisporiales in the Ascomycetes as these taxa are described by Clements and Shear in their Genera of the Fungi, 1931, or in the Eurotiaceae of the Eurotiales in the Ascomycetes as these taxa are described by G. W. Martin in Outline of the Fungi, 1950, or in the Aspergillaceae of the Aspergillales in the Ascomycetes as these taxa are described by E. A. Bessey in his Morphology and Taxonomy of Fungi, 1950.

The fungus agrees well with the generic description of Anixiopsis Hansen (Saccardo, 14: 464, 1899) but does not fit the description of either *A. stercoraria* as described by Hansen (Bot. Zeit., 7: 127–131, 1897) or Cain (Canadian Journal of Botany 35: 260–268, 1957) or *A. peruviana* as described by Cain (Canadian Journal of Botany, 35: 260–268, 1957). It differs from the former in having ascospore walls thickened in the form of reticulations and in having larger ascospores. From the latter, it differs in having the reticulations on the ascospores, larger and darker ascospores, no chlamydospores and faster growth.

This culture represents a new species that at least at present should be placed in the genus Anixiopsis. The name proposed for this organism is *Anixiopsis reticulispora* sp. nov.

A culture of this organism has been deposited with the American Type Culture Collection of Washington, D.C., and given the ATCC No. 14362.

It is to be understood that for the production of the keratinolytic enzyme according to the present invention, it is also intended to include isolates as well as mutants produced from this organism by various means such as radiation with X-ray, ultra-violet light, treatment with mustard gases, and the like. We wish also to include any organism, regardless of its appearance or physiological behavior, that may be developed by means of transformation, transduction, genetic recombination or some other genetical procedure, using a nucleic acid or an equivalent material from the herein described species, whereby it has acquired the ability to produce the elaboration product here described or to carry on the biochemical change here described.

For the preparation of the enzyme of this invention, a wide variety of fermentation nutrient media are satisfactory. A nutrient medium composed basically of a source of nitrogen, carbon and minerals is required. Satisfactory nitrogen sources include hydrolyzed casein of various types, soy bean meal, distiller's soluble, corn meal, nitrates, amino salts, urea and the like. Suitable carbon sources are: soy bean meal, hoof meal, wool and hair. The preceding materials have sufficient minerals to satisfy the mineral requirements of the organism without substantial addition of mineral components. A typically suitable aqueous nutrient medium is 1.5 g./l. of dipotassium hydrogen phosphate, 0.05 g./l. of magnesium sulfate septahydrate 0.05 g./l. calcium chloride, 0.15 g./l. ferrous sulfate septahydrate, 0.05 g./l. zinc sulfate septahydrate, 10 g./l. ammonium nitrate, 30 g./l. soy bean meal and 4 g./l. of keratinaceous material. The pH of the fermentation media is most suitably maintained between 7.0 and 10.0. The preferred range is between 8.5 to 9.5. After autoclaving and inoculating the aforesaid media, the fermentation is carried out at a temperature usually between about 25° C. and about 35° C. with aeration. The progress of the fermentation may be qualitatively followed by testing the softness and breakability of hair which has been contacted with the media. The progress may be quantitatively followed by testing the ability of the fermentation product to break down insoluble keratin. This may be measured by the amount of free amino acids which are formed. By this procedure, the keratinolytic activity of the broth may be followed.

For the commercial production of the keratinolytic agent of this invention, submerged culture in the usual type of equipment is employed. Suitable tanks varying in size from 20 gallons to 2000 gallons or more, equipped with sufficient agitation and means for aspectic aeration of the contents with one or more volumes of air per minute are employed. A satisfactory medium for large scale production was given above. The growth of the fungus and the enzyme production usually reach a maximum after about 60 to about 150 hours at about 25 to about 35° C. Variation in the equipment used, the rate of aeration, stirring, etc. frequency affect the time period for maximum keratinolytic activity to be reached. It appears that at least 24 hours are required in any case. Aeration of the medium is maintained at a rate of ½ to 2 volumes of air per volume of broth per minute. Aseptic conditions, of course, must be maintained throughout the transfer of the microorganism. The keratinaceous material which is added to the aspetic medium is sterilized by contact with ethylene oxide and then aspetically added to the aforementioned medium.

After a satisfactory level of keratinolytic activity is obtained, the active eneyzme may be isolated by procedures well known to those killed in the art. For example, the enzyme may be isolated by filtering the broth and adjusting the pH to about 7.0 with an inorganic acid, concentrating the mixture to approximately one tenth its original volume at temperatures below 40° C. Thereafter, this concentrate is admixed with two volumes of a water miscible organic solvent and allowed to stand for about one hour. The insoluble material which contains the enzyme is filtered off. The enzyme obtained in this manner may be further purified by reprecipitation, column chromatography, solvent extraction and dialysis.

The enzyme of this invention is characterized by the following properties: it is non-dialyzable, inactivated by heating at 80° C., for 5 minutes, precipitated by ammonium sulfate and is water soluble.

This enzyme is further characterized by the varying degrees of inactivation which are produced by the addition of various chemical agents to an aqueous solution of the enzyme at a concentration of 5 mg./ml. buffered with a phosphate buffer to a pH of 9.0. The keratinolytic activity of this solution is 50% inactivated by 0.01 M ethylenediaminetetraactic acid; 70% inactivated by 0.01 M sodium cyanide, 60% inactivated by 0.01 M sodium sulfide; 50% inactivated by 0.0003 M thiamine hydrochloride. The keratinolytic activity of the aforementioned enzymatic solution is not altered by the addition of 0.01 M sodium citrate and 0.001 M ethylenediaminetetraacetic acid.

As previously indicated, keratinaceous materials are quite resistant to degradation. This characteristic distinguishes these materials from other types of proteins. It is well known, however, that a small quantity of all natural keratinaceous matter may be digested by proteolytic enzymes such as trypsin, pepsin and papain. For example, these enzymes will convert approximately 5–15% of a keratinaceous material to the water soluble polypeptides and amino acids. The culture of this invention is capable of converting approximately 80 to 100% of keratinaceous material such as hair, feathers and wool to the water soluble polypeptides and amino acids. The keratinolytic activity of both the culture and enzyme of this invention is substantially affected by the PH of the medium in which the digestion of the keratin-containing material takes place. It has been demonstrated that substantial keratinolytic activity occurs throughout the alkaline pH range, for example, from about a pH 7 to about 10. The preferred pH range is from about 8.5 to 9.5. The acivity of both the culture and enzyme appear to be maximal within the preferred range.

The enzyme of this invention as previously indicated, may be combined with a suitable aqueous cosmetic base and employed as a depilatory. The cosmetic base which is employed as a vehicle may be in the form of a cream, an aerosol, paste, a liquid or an ointment. This cosmetic base would generally include a diluent, a wetting agent, a bodying agent, and, preferably, a perfume and would be suitably buffered to maintain the pH of the solution at about 8.5. The aforesaid keratinase may be admixed with the cosmetic base either immediately before its use or it may be manufactured and sold as the mixture.

It may be employed alone or admixed with other depilatory agents and cosmetic ingredients. The use of the enzyme of this invention is particularly suitable in shaving cream compositions such as the lather, brushless or the aerated type. Although the keratinase of this invention can be employed in sufficient concentration to replace the shaving procedure entirely, it is also contemplated to employ the keratinase in lower concentrations in said shaving compositions so as to soften the hair, thus increasing the ease of the shaving operation.

A further use of this enzyme of this invention is as an ingredient in hair curling preparations. Hair which was set and treated with this enzyme containing preparation maintained its wavy nature for a significantly longer period of time than hair set with a non-enzyme containing preparation. Alternatively, very coarse, curly, kinky hair treated with this enzyme containing preparation which was then washed, uncurled and dried, remained straight and did not return to its original curly appearance.

The following examples are given by way of illustration and are not intended to depart from the spirit and scope of the apepnded claims.

*Eaxmple I*

A nutrient medium having the following composition is prepared, adjusted to pH 8.3 and sterilized. Thereafter 4 g. of human hair sterilized with ethylene oxide is added to said medium.

| Ingredient: | Gram/liter |
|---|---|
| $K_2HPO_4$ | 1.500 |
| $MgSO_4 \cdot 7H_2O$ | 0.050 |
| $CaCl_2$ | 0.050 |
| $FeSO_4 \cdot 7H_2O$ | 0.015 |
| $ZnSO_4 \cdot 7H_2O$ | 0.005 |
| $NH_4NO_3$ | 1.000 |
| Soy bean meal | 20.000 |

Inoculum is prepared by transferring the growth of a well sporulated slant of ATCC No. 14362 to a portion of this medium and incubating for about 72 hours at 27° C. on a rotary shaker. The main batch of medium is then inoculated by mixing with 5% by volume of the inoculum so prepared. Aeration is effected at a rate of about one volume of air per minute and efficient agitation is provided during incubation at 28° C.

At the end of a 5 day period, practically all of the human hair which had been added to the fermentation broth was digested.

*Example II*

The filter broth as produced in Example I was applied directly to a calf hide and allowed to stand, at room temperature, for eight hours. Thereafter, the hair was easily removed from the hide by a light brushing.

*Example III*

A fermentation broth is prepared as described in Example I and clarified by filtration. The filter broth is admixed with stirring with an equal volume of ethyl alcohol and a precipitate is obtained. This precipitate is washed two times with 100 ml. of ethyl alcohol and dried under vacuum.

The aforesaid enzyme may also be precipitated from the fermentation broth by the addition of an equal amount of acetone or isopropyl alcohol. An aqueous solution of the enzyme buffered with 0.2 M dipotassium hydrogen phosphate at pH 9.0 was applied to human hair and was found to readily soften it within 3 to 4 hours.

*Example IV*

The procedure employed in Example I was repeated employing different keratinaceous materials: wool, dog hair, rat hair, mouse hair, monkey hair, cat hair, rabbit hair, human fingernails, chicken feathers and cattle hoofs. These cultures were incubated for six days at 30° C. In all cases, almost all of the keratinaceous material employed was digested.

*Example V*

A powder depilatory formulation was prepared containing the following ingredients.

| Ingredients: | Grams |
|---|---|
| Enzyme of Example III | 3.00 |
| Polysorbate 80 | 0.05 |
| Methyl cellulose | 1.00 |
| Corn starch | 35.00 |
| Talc | 39.00 |
| Methanol | 0.25 |
| Perfume | 0.25 |

Before application, the dry powder is moistened with water to the consistency of a paste and sufficient alkali is added to achieve a pH of 9.0.

Example VI

A paste depilatory was prepared containing the following ingredients.

| Ingredients: | Grams |
|---|---|
| Enzyme of Example III | 4 |
| Kaolin | 28 |
| Calcium carbonate | 4 |
| Glycerine | 1 |
| Dipotassium hydrogen phosphate | 4 |
| Water | 59 |

The pH of this composition was adjusted to 8.0 with a 0.1 N phosphoric acid solution.

Example VII

A lather shaving cream was prepared having the following compositions.

| Ingredients: | Grams |
|---|---|
| Enzyme of Example III | 4.00 |
| Stearic acid | 35.00 |
| Cocoanut oil | 10.00 |
| Potassium hydroxide | 6.10 |
| Sodium hydroxide | 2.00 |
| Glycerine | 8.00 |
| Water | 34.9 |

The pH of this preparation was brought to 9.0 with sodium hydroxide.

Example VIII

An aerosol shaving formulation was prepared having the following ingredients.

| Ingredients: | Grams |
|---|---|
| Enzyme of Example III | 2.00 |
| Glycerine | 10.00 |
| Triethanolamine | 4.00 |
| Stearic acid | 4.5 |
| Cocoanut fatty acid | 1.5 |
| Perfume | 0.375 |
| Glycerol monostearate | 5.0 |
| Nitrogen | |
| Water | 70.625 |

This composition has a pH between 7.0 and 8.0 The nitrogen propellent employed in the aforementioned formulation was charged into an aerosol can at a pressure of 75 lbs./sq. inch after the other materials had been admixed and previously added to said can.

What is claimed is:

1. The process of producing a keratinase enzyme which comprises contacting a culture of *Anixiopsis reticulispora* ATCC No. 14,362 in an aqueous nutrient medium having a pH in the range of about 7.0 to about 10.0 until substantial proteolytic activity is imparted to the medium and recovering the keratinase enzyme thereby produced.

2. The process of treating keratinaceous material to produce useful protein degradation products, said process comprising the steps of growing a culture of *Anixiopsis reticulispora* ATCC No. 14,362 in an aqueous medium containing keratinaceous material while maintaining the pH of said medium in the range of about 7 to 10 and recovering the water soluble protein degradation products of the aforesaid process.

3. The process as claimed in claim 2 wherein the pH is maintained in the range of about 8.5 to about 9.5.

References Cited by the Examiner

UNITED STATES PATENTS

| | | | |
|---|---|---|---|
| 2,848,371 | 8/58 | Yoshida | 195—62 |
| 2,857,317 | 10/58 | Grimm | 195—6 |
| 2,893,920 | 7/59 | Grant et al. | 195—62 |
| 2,988,487 | 6/61 | Nickerson et al. | 195—5 |
| 2,988,488 | 6/61 | Robison et al. | 195—6 |
| 3,096,253 | 7/63 | Koh et al. | 195—62 |

OTHER REFERENCES

White et al.: Mycologia, 42, 199–223 (1950).

Carmichael: Canadian Journal of Botany, vol. 40, No. 8, Aug. 27, 1962, pages 1138–1173 (pages 1170–1171 particularly relied upon).

A. LOUIS MONACELL, *Primary Examiner.*

ABRAHAM H. WINKELSTEIN, *Examiner.*

UNITED STATES PATENT OFFICE
CERTIFICATE OF CORRECTION

Patent No. 3,173,847                                March 16, 1965

Donald A. Kita et al.

It is hereby certified that error appears in the above numbered patent requiring correction and that the said Letters Patent should read as corrected below.

Column 3, line 70, and column 6, line 18, for "14362", each occurrence, read -- 14,862 --; column 8, lines 9 and 16, for "14,362", each occurrence, read -- 14,862 --.

Signed and sealed this 22nd day of February 1966.

(SEAL)
Attest:

ERNEST W. SWIDER                                EDWARD J. BRENNER
Attesting Officer                                     Commissioner of Patents